United States Patent
Lehman et al.

(10) Patent No.: US 11,448,302 B2
(45) Date of Patent: Sep. 20, 2022

(54) PICK-UP REEL FOR AN AGRICULTURAL HARVESTER HAVING A CONSTANTLY ENGAGED ROLLER BEARING ASSEMBLY

(71) Applicant: CNH Industrial America LLC, New Holland, PA (US)

(72) Inventors: Barry E. Lehman, York, PA (US); Robert D. Crandall, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 817 days.

(21) Appl. No.: 16/275,112

(22) Filed: Feb. 13, 2019

(65) Prior Publication Data
US 2020/0256437 A1   Aug. 13, 2020

(51) Int. Cl.
*F16H 53/06*  (2006.01)
*A01D 57/02*  (2006.01)
*A01D 57/03*  (2006.01)

(52) U.S. Cl.
CPC ............ *F16H 53/06* (2013.01); *A01D 57/03* (2013.01); *B60Y 2200/222* (2013.01)

(58) Field of Classification Search
CPC ....... F16H 53/02; F16H 53/06; A01D 57/025; A01D 57/03; B60Y 2200/222
See application file for complete search history.

(56) References Cited

U.S. PATENT DOCUMENTS

| 4,156,340 | A | * | 5/1979 | Colgan | ................. A01D 57/03 |
| | | | | | 56/226 |
| 4,406,173 | A | * | 9/1983 | Lagain | .................... B29C 65/18 |
| | | | | | 74/54 |
| 4,993,275 | A | * | 2/1991 | Pollich | ................... B41F 21/05 |
| | | | | | 74/54 |
| 5,359,839 | A | | 11/1994 | Parsons et al. | |
| 5,595,053 | A | | 1/1997 | Jasper et al. | |
| 6,530,202 | B1 | | 3/2003 | Guyer | |
| 6,708,475 | B2 | | 3/2004 | Guyer | |
| 6,843,045 | B2 | * | 1/2005 | Bickel | .................... A01D 57/03 |
| | | | | | 56/14.4 |
| 8,590,284 | B2 | * | 11/2013 | Rayfield | ................ A01D 75/18 |
| | | | | | 56/226 |
| 8,857,333 | B2 | * | 10/2014 | Bassat | .................... B41F 21/04 |
| | | | | | 101/409 |
| 10,426,091 | B2 | * | 10/2019 | Honey | .................. A01D 57/04 |

(Continued)

FOREIGN PATENT DOCUMENTS

| DE | 1170741 | B | * | 5/1964 | ............. | F16H 25/16 |
| FR | 1101917 | A | * | 10/1955 | ............. | F16H 53/06 |

(Continued)

*Primary Examiner* — Adam D Rogers
(74) *Attorney, Agent, or Firm* — Peter Zacharias; Patrick Sheldrake

(57) ABSTRACT

A cam assembly is provided for a pick-up reel of an agricultural harvester. The cam assembly includes a cam track, a roller bearing assembly, a crank arm, and a biasing member. The roller bearing assembly includes a baffle and first and second cam followers. The first and second cam followers are each mounted to the baffle in spaced apart relation and engaging the cam track. The crank arm is for mounting to the pick-up reel. The biasing member biases the roller bearing assembly relative to the crank arm.

17 Claims, 5 Drawing Sheets

(56) References Cited

U.S. PATENT DOCUMENTS

| | | |
|---|---|---|
| 2017/0005902 A1 | 1/2017 | Mirsky et al. |
| 2017/0055451 A1* | 3/2017 | Jasper .................... A01D 57/03 |
| 2017/0059027 A1 | 3/2017 | Jasper |
| 2019/0387679 A1* | 12/2019 | Farley .................... A01D 41/14 |
| 2021/0267126 A1* | 9/2021 | Lehman ................. A01D 57/03 |

FOREIGN PATENT DOCUMENTS

| | | | | |
|---|---|---|---|---|
| FR | 2273623 A1 * | 1/1976 | ............. | F16H 53/06 |
| WO | WO-2018140459 A1 * | 8/2018 | ............. | A01D 41/14 |

* cited by examiner

PICK-UP REEL FOR AN AGRICULTURAL HARVESTER HAVING A CONSTANTLY ENGAGED ROLLER BEARING ASSEMBLY

BACKGROUND OF THE INVENTION

The present disclosure relates generally to an agricultural harvester having a cam assembly that includes a constantly engaged roller bearing assembly with a cam track. In particular, the subject disclosure relates to a cam follower of the cam assembly that is biased to engage a cam track of the roller bearing assembly.

Conventional harvesters include harvesting reels, such as a pick-up reel, a draper reel or a gathering reel. Pick-up reels are used on agricultural harvesters to guide crops to a cutting apparatus. Conventional cam followers of cam assembly designs are limited in their functionality in that they do not provide a consistent stable grip on or engagement with a cam track. As such, the cam followers of the roller bearing assembly are not tightly secured to the cam track or have too much movement (e.g. moving from in contact with and not in contact with) relative to the cam track throughout its entire range of motion. Consequently, the cam assembly of the pick-up reel may not operate as effectively and efficiently as desired.

SUMMARY OF THE INVENTION

In accordance with an exemplary embodiment, the present disclosure provides a cam assembly for a pick-up reel of an agricultural harvester. The cam assembly includes a cam track, a roller bearing assembly, a crank arm, and a biasing member. The roller bearing assembly includes a baffle and first and second cam followers. The first and second cam followers are each mounted to the baffle in spaced apart relation and engage the cam track. The crank arm is mounted to the pick-up reel. The biasing member biases the roller bearing assembly relative to the crank arm.

In accordance with another exemplary embodiment, the present disclosure provides a pick-up reel for an agricultural harvester. The pick-up reel includes a central rotating shaft, a plurality of support members, and a cam assembly for guiding movement of the plurality of support members. The plurality of support members extend widthwise across the pick-up reel and are connected to the central rotating shaft. The cam assembly includes an endless track and a roller bearing assembly operatively connected to at least one of the plurality of support members. The roller bearing assembly includes a pair of cam followers having a torque force engaging the pair of cam followers on the endless track.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the subject disclosure, there are shown in the drawings exemplary embodiments. It should be understood, however, that the subject disclosure is not limited to the precise arrangements and instrumentalities shown. In the drawings.

DETAILED DESCRIPTION OF THE DRAWINGS

Figure 1:
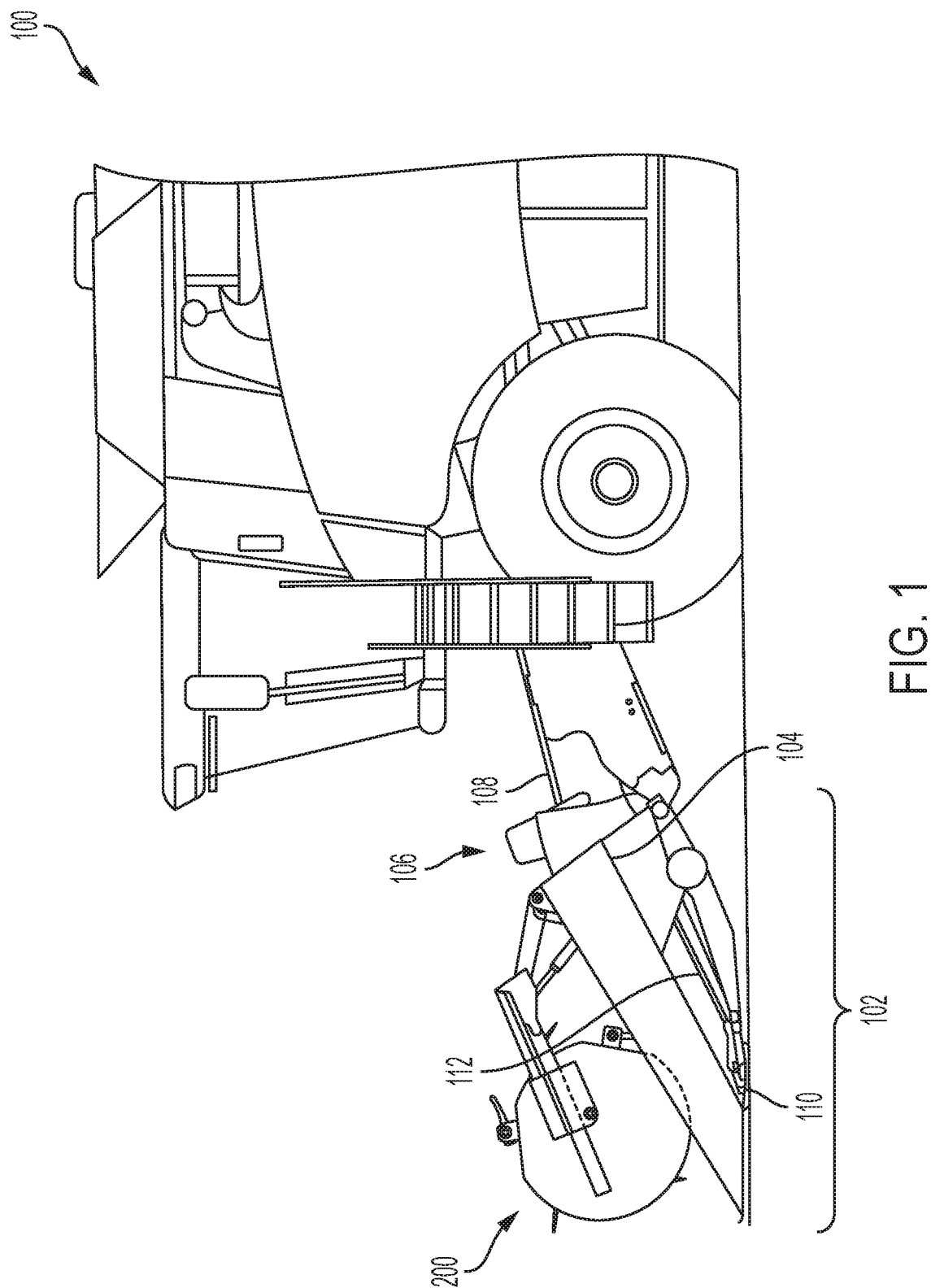
FIG. 1 is a side elevation view of an agricultural harvester in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, FIG. 1 illustrates an agricultural harvester 100 in accordance with an exemplary embodiment of the subject disclosure. The agricultural harvester e.g., a combine harvester 100, includes a header 102 having a chassis or frame 104 that is attached to a forward end 106 of the harvester. The header 102 is configured to cut crops with a cutting apparatus 110 as the harvester 100 moves forward over a crop field. The header includes a pick-up reel 200 and a draper belt 112 for moving crop materials rearwardly, feeding the crop material to the harvester 100 through a feederhouse 108.

Figure 2:
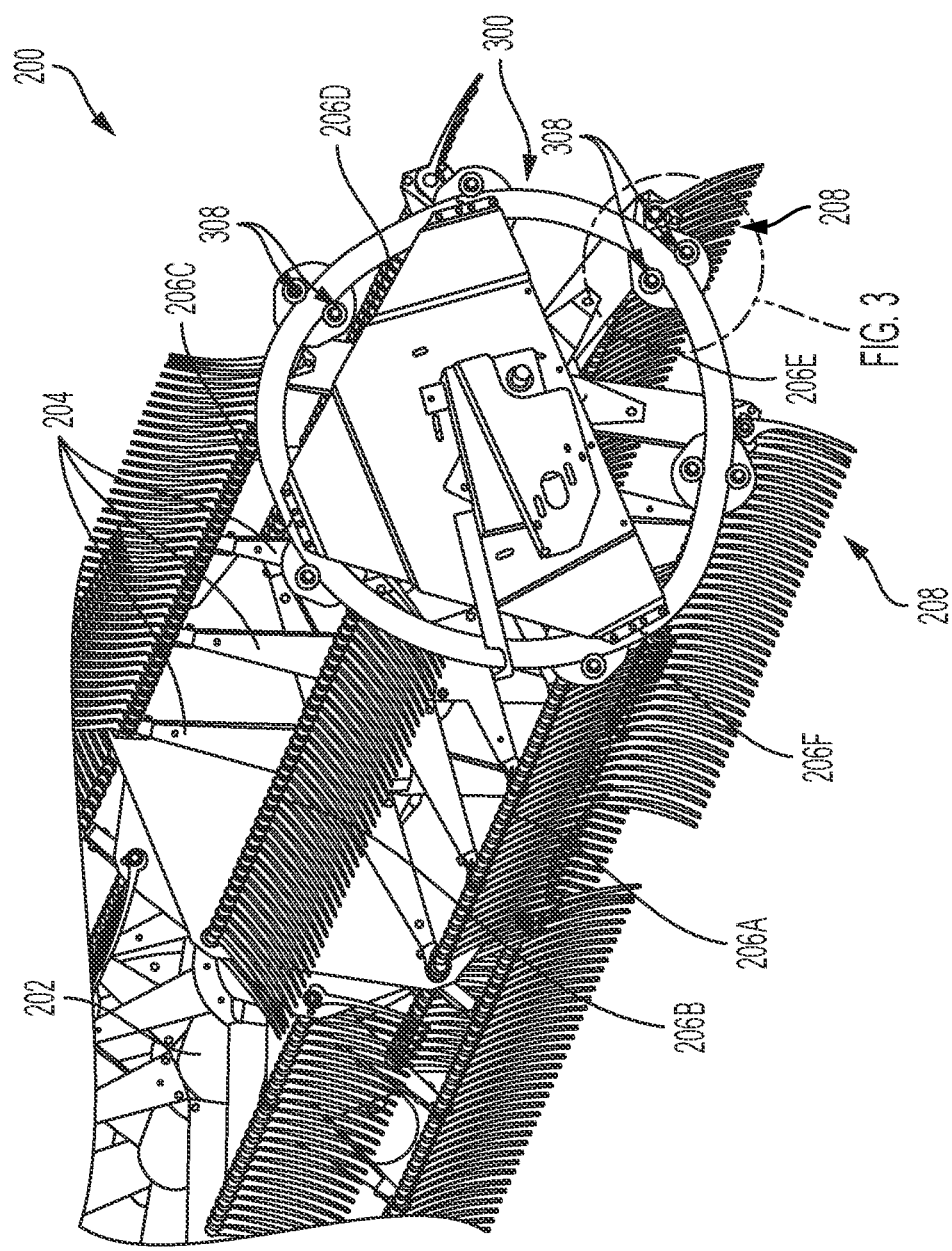
FIG. 2 is a perspective view of a pick-up reel of the agricultural harvester of FIG. 1, with certain features of the pick-up reel omitted for purposes of illustration and showing a cam assembly in accordance with the subject disclosure.

As best shown in FIGS. 1 and 2, the pick-up reel 200 is mounted directly on the header 102 and generally spans laterally and widthwise of the header 102. The pick-up reel 200 includes a central rotating shaft or axle 202, a plurality of support members 206A-F, and a cam assembly 300 at each lateral end of the pick-up reel for guiding movement of the plurality of support members. Additional exemplary embodiments of reel headers but excluding the cam assembly applicable to the subject disclosure are disclosed e.g. in U.S. Patent Application Publication No. 2017/005902, entitled "Cam Follower Design For A Pickup Reel", the entire disclosure of which is hereby incorporated by reference for all purposes.

The central rotating shaft 202 is an axle powered by the header 102 to drive operations of the pick-up reel 200. The central rotating shaft supports the pick-up reel. The central rotating shaft rotates about a longitudinal axis of the pick-up reel.

As best shown in FIG. 2, the plurality of support members 206A-F are circumferentially spaced about the central rotating shaft. The plurality of support members 206A-F extend lengthwise across the pick-up reel and are connected to the central rotating shaft 202 via mounting brackets 204. The support members are mounted to distal portions of the mounting brackets 204. Each of the plurality of mounting brackets 204 extend radially from the central rotating shaft 202. The pick-up reel 200 is illustrated with six support members 206A-F, however the pick-up reel can include more or fewer than six support members, such as one, two, three, four, five, seven, eight, nine, ten, or more. Each support member 206A-F includes a plurality of tines 208 for gathering and directing crop downwardly and rearwardly into the header 102 for subsequent cutting and harvesting operations.

Figure 3:
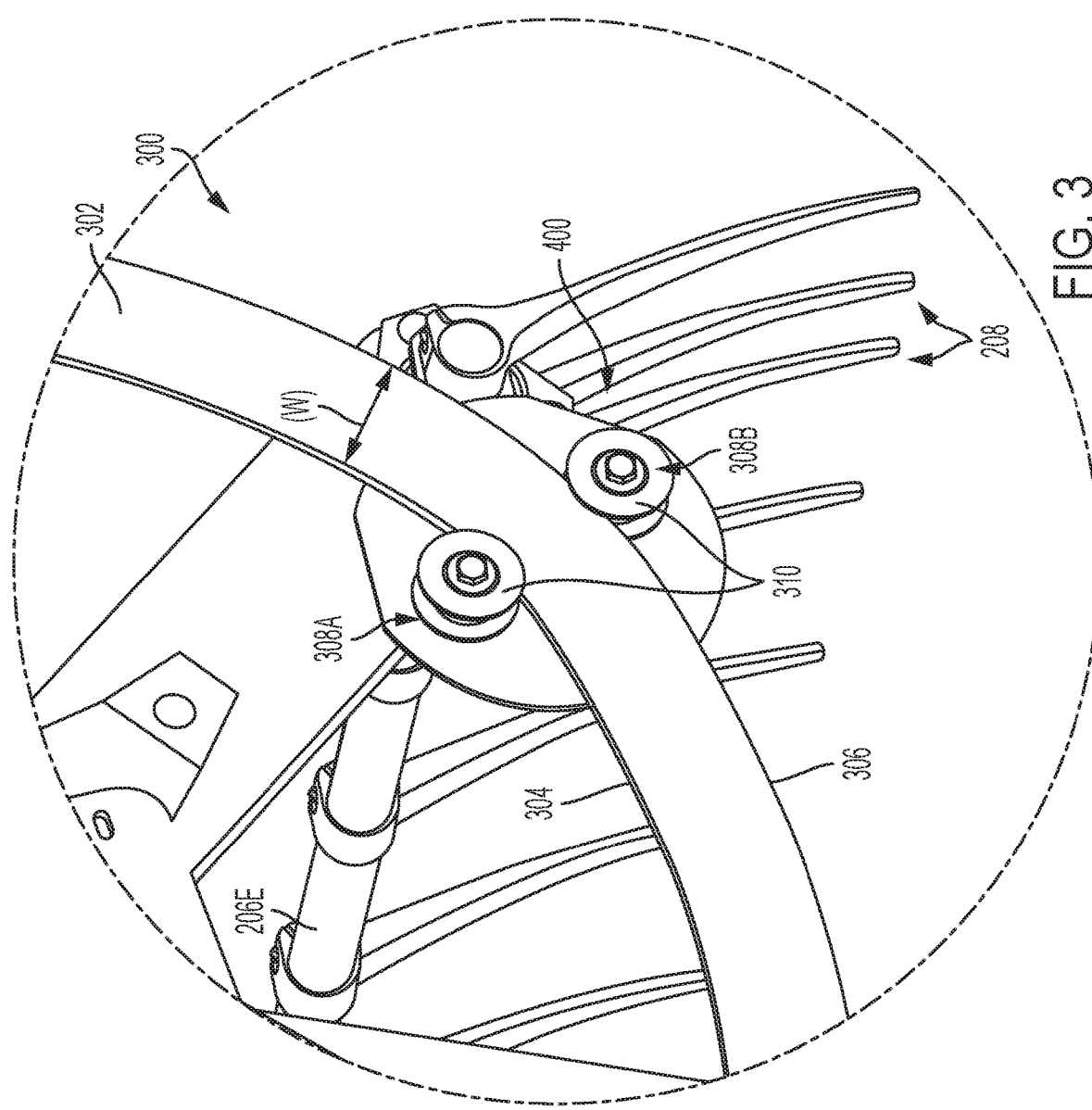
FIG. 3 is an enlarged partial perspective view of a roller bearing assembly of the cam assembly shown in FIG. 2.
Figure 4:
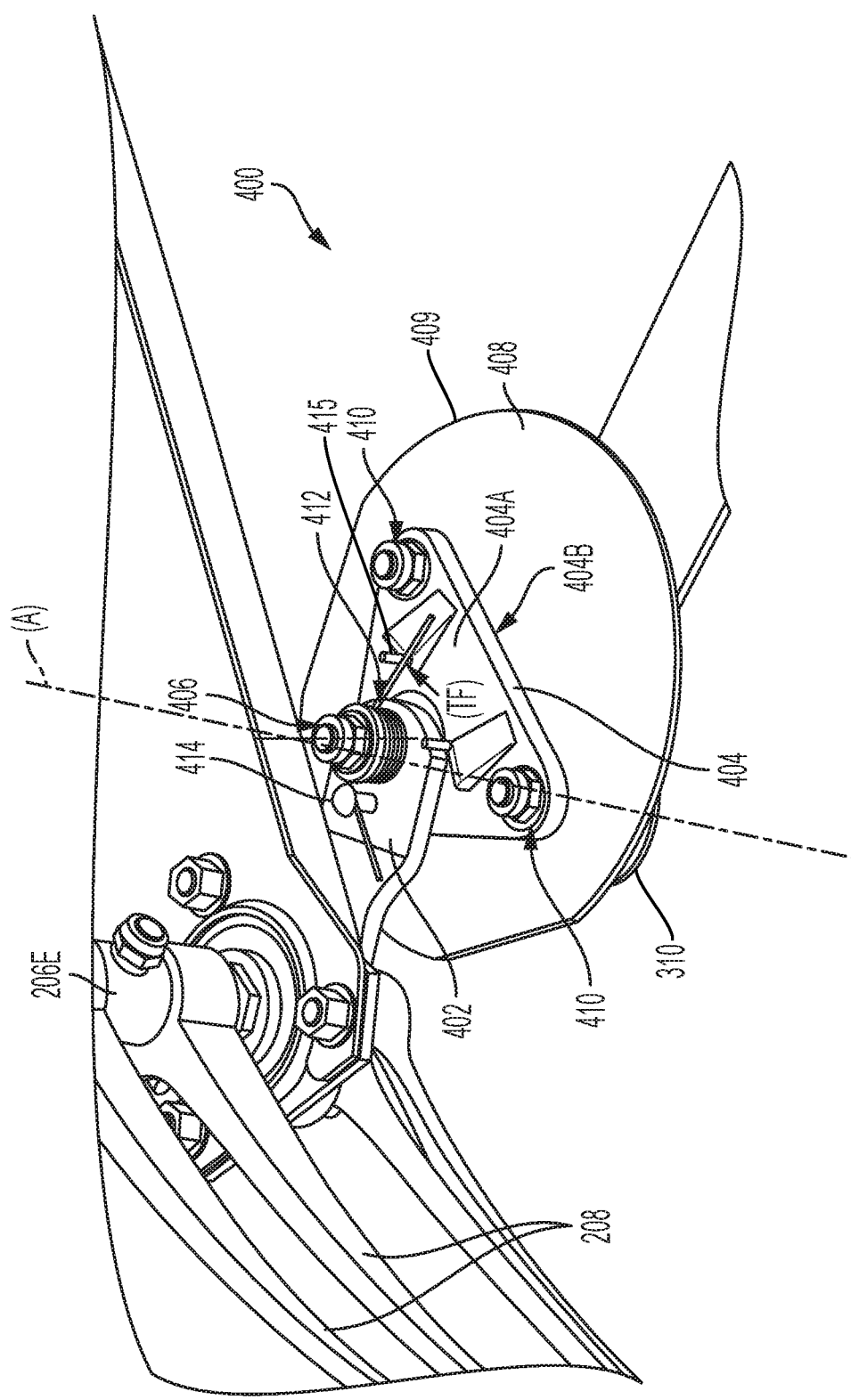
FIG. 4 is an enlarged partial medial side perspective view of the roller bearing assembly shown in FIG. 3; and, FIG. 5 is an enlarged side elevation view of an alternative embodiment of a mount and the crank arm of the roller bearing assembly shown in FIG. 4.

Referring to FIGS. 2-4, the cam assembly 300 includes a cam track 302 and a roller bearing assembly 400. The pick-up reel includes a cam assembly about each lateral end of the pick-up reel, but for purposes of convenience, only the left cam assembly is shown as described. It is understood that the right cam assembly would be a mirror version of the left cam assembly. The cam assembly 300 further includes a crank arm 402 and a biasing member 412. The cam assembly guides movement of the plurality of support members 206A-F along the cam track.

The cam track or endless track 302 of the cam assembly is configured as best shown in FIGS. 2 and 3. The cam track 302 is generally an elongated planar track having a generally overall oblong shape, but can alternatively have any overall shape suitable for its intended purpose, e.g., circular or oval and the like. The cam track 302 has a first side or inner surface 304 and a second side or outer surface 306. The inner surface 304 forms a circumference smaller than the outer surface 306.

The roller bearing assembly 400 of the cam assembly is configured as best shown in FIGS. 3 and 4. The roller bearing assembly includes a first cam follower 308A and a second cam follower 308B. The roller bearing assembly may further include a baffle 408 connected to the pair of cam followers 308A-B.

Referring to FIG. 2, each support member is connected to a respective cam assembly about its respective lateral end. Each roller bearing assembly includes a plurality of cam followers 308A, 308B spaced about the cam track 302 for engaging the cam track. In the exemplary embodiment, each of the first and second cam followers 308A-B are configured as roller bearings 310 as shown in FIG. 3. The first and second cam followers are mounted on the baffle 408 in a spaced apart relation. In particular, the first and second cam followers 308A-B are spaced such that the minimum distance between the inner rolling surfaces of the roller bearings is slightly greater than a width "W" of the cam track 302.

As best shown in FIG. 3, the first cam follower 308A of the roller bearing assembly engages the first side or inner surface 304 of the cam track, and the second cam follower 308B engages a second side or outer surface 306 of the cam track opposite the first side 304. In other words, the roller bearings 310 of the cam followers are positioned to engage the inner surface 304 and the outer surface 306 of the cam track 302.

The baffle 408 of the roller bearing assembly is configured as best shown in FIGS. 3 and 4 in accordance with an exemplary embodiment of the subject disclosure. The roller bearing assembly 400 is biased to rotate about Axis (A) as shown in FIG. 4. The baffle 408 is illustrated as a substantially flat circular disc or plate, but may be provided as a convex or concave disc, or a non-circular shaped disc, e.g., a star shaped disc, a sickle-shaped disc and the like. The baffle 408 can optionally be configured to include sharpened edges 409 to facilitate the cutting or shredding of crop material, e.g., to prevent wrapping of such crop material about the cam assembly parts.

Referring to FIGS. 3 and 4, the roller bearing assembly 400 includes the mount 404. Although FIG. 4 illustrates the mount as triangular-shaped, the mount may have any suitable shape for its intended purpose, for example square-shaped, pentagonal-, hexagonal-, or octagonal-shaped, or circle-shaped. The mount is connected to the crank arm 402 and the cam followers 308A-B via a pivot connection 406. The mount 404 includes a first side 404A mounted to the crank arm 402, and a second side 404B upon which to the roller bearing assembly is mounted to. For example, the second side 404B may be mounted to the baffle 408 followed by the cam followers.

Additionally, as best shown in FIG. 4, a plurality of fasteners 410 attach the baffle 408 and the cam followers 308A-B to the mount 404. The fasteners 410 extend through the baffle 408 to rotatably support the cam followers 308A-B. The roller bearing assembly 400 guides movement of the support members 206A-F, as a result of the cam followers engagement with the cam track 302.

Figure 5:
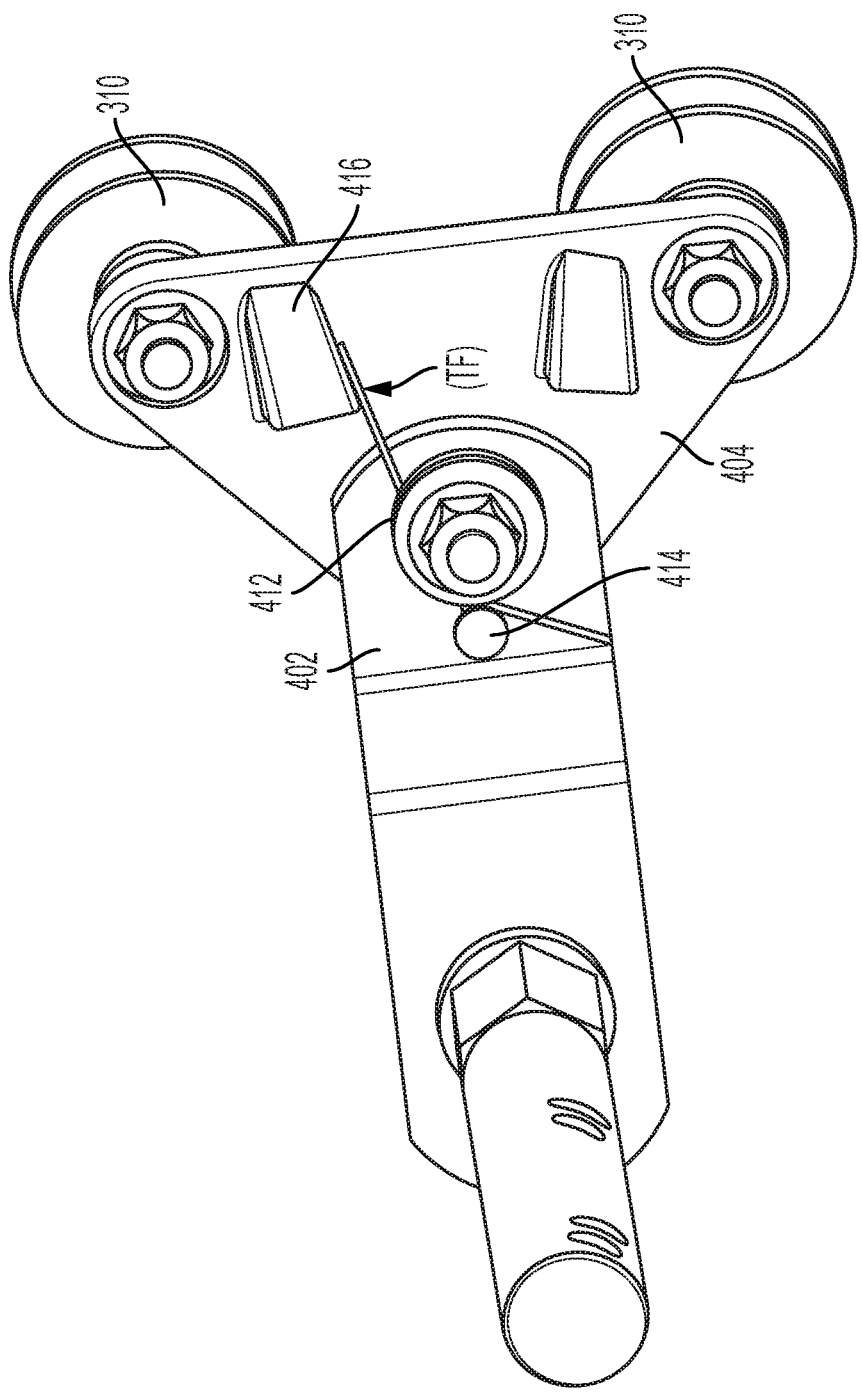

The crank arm 402 of the cam assembly is configured as best shown in FIGS. 4 and 5. The crank arm is an elongated arm and mounted to the pick-up reel 200. The crank arm connects a respective roller bearing assembly 400 to a respective support member at a lateral end of the support member. The roller bearing assembly 400 pivots or shifts relative to the crank arm 402 about the pivot connection 406.

The biasing member 412 is mounted to one of the crank arm and roller bearing assembly. FIG. 4 illustrates the biasing member mounted directly to the crank arm. The biasing member biases the roller bearing assembly 400 relative to the crank arm 402. Non-limiting examples of the biasing member include e.g. a tension spring, coil spring, leaf spring, an elastomer, and the like or combinations thereof. A pin 414 engages one end of the biasing member 412 and another pin 415 on the mount engages an opposite end of the biasing member on the crank arm 402. The biasing member 412 provides a biasing force to bias the roller bearing assembly relative to the crank arm which in turn biases the roller bearing assembly relative to the cam track. FIG. 4 shows one end of the biasing member 412 biasing against the mount 404, and an opposite end biasing against the crank arm 402 which is fixed in position on the support member. Thus, due to the biasing force imparted on the roller bearing assembly 400, the roller bearing assembly rotates about Axis (A) to induce the roller bearings to maintain constant and consistent engagement with the cam track 302. In other words, the biasing member 412 provides a torque force (TF) biasing the roller bearing assembly 400 relative to the crank arm 402. The torque force (TF) generated by the biasing member 412 forces the cam followers 308A-B to remain in constant contact or engagement with the cam track.

FIG. 5 illustrates an alternative embodiment of the mount 404 with the biasing member 412 mounted directly to the crank arm 402. The baffle 408 (as best shown in FIGS. 3 and 4, although not shown in FIG. 5) operates the same with the alternative embodiment of the mount 404, wherein the fasteners 410 extend through the baffle to rotatably support the roller bearings 310. The pin 414 engages one end of the biasing member 412, and a raised stop 416 on the mount engages the opposite end of the biasing member. The biasing member 412 provides a torque force (TF) on the stop 416 biasing the roller bearing assembly relative to the crank arm 402, thus forcing the roller bearings 310 to remain in substantially constant contact or engagement with the cam track.

It will be appreciated by those skilled in the art that changes could be made to the exemplary embodiments described above without departing from the broad inventive concept thereof. It is to be understood, therefore, that the subject disclosure is not limited to any particular exemplary embodiments disclosed, but it is intended to cover modifications within the spirit and scope of the subject disclosure as defined by the appended claims.

What is claimed is:

1. A cam assembly for a pick-up reel of an agricultural harvester comprising:
    a cam track;
    a roller bearing assembly having:
        a baffle, and
        a first cam follower and a second cam follower, each mounted to the baffle in spaced apart relation and engaging the cam track;
    a crank arm for mounting to the pick-up reel; and
    a biasing member biasing the first and second cam followers into engagement with the cam track.

2. The cam assembly of claim 1, wherein the first cam follower engages a first side of the cam track and the second cam follower engages a second side of the cam track opposite the first side.

3. The cam assembly of claim 1, wherein the biasing member provides a torque force on the roller bearing assembly.

4. The cam assembly of claim 1, wherein the roller bearing assembly is biased to rotate about a central axis of the baffle.

5. The cam assembly of claim 1, further comprising a mount having a first side mounted to the crank arm and a second side mounted to the roller bearing assembly.

6. The cam assembly of claim 1, wherein the roller bearing assembly pivots relative to the crank arm.

7. The cam assembly of claim 1, wherein the first and second cam followers are roller bearings.

8. A pick-up reel header for an agricultural harvester comprising the cam assembly of claim 1.

9. An agricultural harvester comprising a pick-up reel having the cam assembly of claim 1.

10. A pick-up reel for an agricultural harvester comprising:
    a central rotating shaft;
    a plurality of support members extending widthwise across the pick-up reel and connected to the central rotating shaft;
    a cam assembly for guiding movement of the plurality of support members, the cam assembly having:
        an endless track, and
        a roller bearing assembly operatively connected to at least one of the plurality of support members, the roller bearing assembly comprising a pair of cam followers having a biasing member providing a torque force engaging the pair of cam followers on the endless track.

11. The pick-up reel of claim 10, wherein each of the pair of cam followers engages an opposite side of the endless track.

12. The pick-up reel of claim 10, wherein the roller bearing assembly further comprising a baffle connected to the pair of cam followers.

13. The pick-up reel of claim 10, further comprising a crank arm connected to the roller bearing assembly.

14. The pick-up reel of claim 13, further comprising a mount connected to the crank arm and the pair of cam followers.

15. The pick-up reel of claim 10, wherein the roller bearing assembly pivots relative to the crank arm.

16. The pick-up reel of claim 10, wherein the pair of cam followers are roller bearings.

17. An agricultural harvester comprising the pick-up reel of claim 10.

* * * * *